United States Patent [19]

Mädge et al.

[11] 4,329,041
[45] May 11, 1982

[54] CAMERA HAND GRIP

[76] Inventors: Joachim Mädge, Köslinstrasse 138; Günter Adamski, Koblenzer Strasse 46; Claus Prochnow, Lange Strasse 38, all of 3300 Braunschweig, Fed. Rep. of Germany

[21] Appl. No.: 181,827

[22] Filed: Aug. 27, 1980

[30] Foreign Application Priority Data

Aug. 31, 1979 [DE] Fed. Rep. of Germany ....... 2935173

[51] Int. Cl.³ .............................................. G03B 17/56
[52] U.S. Cl. ................................................. 354/293
[58] Field of Search ................... 354/81, 82, 293, 266, 354/269; 352/243

[56] References Cited

U.S. PATENT DOCUMENTS

| 3,333,519 | 8/1967 | Padelt | 354/82 |
| 4,097,883 | 6/1978 | Adamski et al. | 354/293 |
| 4,208,113 | 6/1980 | Prochnow | 354/82 |

FOREIGN PATENT DOCUMENTS

| 229715 | 10/1963 | Austria . |
| 1255477 | 11/1967 | Fed. Rep. of Germany . |
| 1281259 | 10/1968 | Fed. Rep. of Germany . |
| 405925 | 7/1966 | Switzerland . |

Primary Examiner—John Gonzales
Attorney, Agent, or Firm—Staas & Halsey

[57] ABSTRACT

The present invention provides a hand grip which makes it possible to hold a camera by the grip fixed under the camera body or by the grip disposed to the left or right alongside the camera body. A release button which is disposed on the grip and by which the camera shutter is usually triggered, is fully capable of functioning in all possible positions of the grip. It always lies on the front of the grip and can be operated in the customary manner with the index finger. A connecting member is used between the hand grip and the camera. This connecting member may be a supporting plate with attachment bolt for connection to the grip itself. Or by constructing the connecting member as a T-shaped side holder, the hand grip can be optionally located on the left or right side of the camera body. When the hand grip is locked on the camera body, the push rod guided in the side holder simultaneously comes in mechanical contact with the release or the release contact of the camera and translates the movement of the release button in the grip into an actuation of the release or of the release contact in the camera body. Other elements are provided for the hand grip and connector structure so that various attachments in addition to the camera may be held thereby.

18 Claims, 8 Drawing Figures

CAMERA HAND GRIP

BACKGROUND OF THE INVENTION

1. Field of the Invention

The invention relates to a camera hand grip for separable connection to a camera of the hand held type.

Such a hand grip which is separably connected to the camera serves to facilitate handling of the camera.

2. Description of the Prior Art

In the case of known hand grips of this type, the grip is adapted in its form to a specific camera position which is ideal for photography, so that the grip fits easily into the hand so that hand grip and camera can be held for a relatively long period without fatigue, and thus without risk of wobble.

However, when a photograph is being taken, some cameras, e.g. mirror reflex cameras with a ground glass indirect and a direct-vision viewfinder, have to be held in different positions. A camera with a direct-vision viewfinder must be lifted directly to the eye so that an ergonometrically favorable supporting of the camera is possible only if the grip is disposed underneath the camera body. In the case of cameras with an indirect-vision viewfinder, on the other hand, the user must be able to look down onto the camera body from above. In such a case, it is only possible for the camera to be ergonometrically held if the hand grip is so disposed on the camera body that the grip is located at the side of the camera body. Left-handed camera users prefer the grip to be disposed on the left beside the camera body while right-handed camera users ask for the grip to be located on the right of the camera body (in either case looking in the direction of the object to be photographed).

For each way of holding the camera, practice hitherto has been to use a specially adapted camera hand grip in which case the particular design of the grip offers ergonomically optimum operation in the associated camera position.

A camera hand grip has already been suggested which has a grip disposed laterally alongside the camera body when the hand grip is fixed to the camera. The grip itself can be fixed on the camera body by means of a connecting element separably fixed thereto. The camera release is located on the front face of the grip and must be operated by the thumb. This means it is possible to attach the hand grip to the camera body in two different positions, whereby the grip is on the right in one position and on the left of the camera body in the other position. This hand grip can therefore, in the case of a camera which has an indirect-vision viewfinder, be used by both the left-handed and also the right-handed camera user, although certainly operation of the release button with the thumb instead of the normally customary operation of the camera release with the index finger, compels the camera user to an initially disturbing change of habit. However, this hand grip can no longer be used if the camera user wishes to use the camera which—as is already conventional nowadays—is additionally equipped with a direct-vision viewfinder, to take a photograph in a position which makes it possible to use the ground glass indirect-vision viewfinder. In this case, the camera user is compelled completely to remove the hand grip and either to hold the camera by the camera body or to equip himself with a further camera hand grip for the purpose.

SUMMARY OF THE INVENTION

The present invention is based therefore on the problem of providing a hand grip of the type mentioned at the outset which makes it possible to hold the camera in all possible positions, in other words to hold the camera by a grip fixed under the camera body or by a grip disposed to the left or right alongside the camera body.

The camera hand grip according to the present invention makes it possible not only to hold a camera which has both indirect and direct-vision viewfinders in an ergonomically favorable manner for both right and left-handed persons in all the necessary positions for taking a photograph, but can also be used easily on various models of camera, possibly with a minor adaptation which can be undertaken by the camera user himself, whereby in such cases he can guarantee ergonomically optimum holding of the camera in the operative position.

A particularly advantageous feature of the present invention is that the release button which is disposed on the grip and by which the camera shutter is usually triggered, is fully capable of functioning in all possible positions of the grip. It also always lies on the front of the grip which points towards the object being photographed and can be operated in the customary and ergonomically favorable manner with the index finger. What is more, the simple fitment on, and locking on, the camera body automatically ensures transference of the camera release function from the release button to the shutter release contact or the camera release.

Another advantageous feature of the invention is also disclosed wherein by the design of the lever transmission and of the fitment housings, it is possible to produce both the lever transmission and also the grip itself is truly competitive fashion so that the hand grip constitutes a keenly priced accessory which by reason of its price is also interesting for the amateur photographer.

Also an advantageous feature of the invention exists wherein by constructing the connecting member as a T-shaped side holder, the hand grip can be so designed that when it is attached to the camera body, the grip can be optionally located on the left or right side of the camera body. When the hand grip is locked on the camera body, the push rod guided in the side holder simultaneously comes in mechanical contact with the release or the release contact and translates the movement of the release button in the grip into an actuation of the release or of the release contact in the camera body. The internally screwthreaded longitudinal bore provided in the transverse part of the side holder makes it possible to fit further holding members which make it possible for the hand grip to be individually adapted to the shape of the camera body.

Also another favorable feature of the invention is disclosed in which shaped recesses and/or projections constitute a non-rotatable connection between the side holder and further holding members.

A further advantageous feature of the invention is a result of designing the connecting member between grip and camera body as a supporting plate so that the hand grip can be fitted to the camera body so that the grip is located directly underneath the bottom of the camera body and is thus directly below the center of gravity of the camera. Here, too, by a simple fitment of the supporting plate to the bottom of the camera body, which is effected furthermore by means of the tripod screw, the mechanical coupling of the release button in the grip to the release or release contact in the camera body is automatically ensured by the push rod guided in the bolt.

A preferred embodiment of the invention is characterized in that the bolt is separably held in the supporting plate by means of a screw-thread. This arrangement makes it possible to remove the bolt from the supporting plate, and to use this latter purely as a fixing plate in conjunction with the hand grip which is composed of grip and side holder.

According to a further feature of the invention, it is thereby envisaged that the supporting plate carry transversely projecting humps each of which has, for passage of a bolt, an axial through bore and shaped projections and/or recesses which engage in form-locking fashion into shaped recesses and projections on the side holder. By reason of this construction of the supporting plate, this latter can be previously mentioned be connected to the side holder. To this end, a screw is passed through the axial bore in one of the humps and screwed into the female screwthread in the transverse part of the side holder. The molded projections and/or troughs on the hump and on the end face of the transverse part of the side holder which become thereby inter-engaged permit a rotation-resistant connection.

A further advantageous form of embodiment of the invention has at least one shoulder piece serving preferably as an extension of the transverse part of the side holder and which has an axial through-bore intended for passage of a screw and shaped projections and/or recesses which engage in form-locking fashion into the shaped recesses and/or projections on the side holder. In this way, the transverse part of the side holder can be extended beyond the top of the camera so that further accessories such as a flash gun, can be mounted on it.

In a further embodiment of the invention, the hand grip has at least one transverse rail with two humps respectively projecting transversely from the ends, each of which has an axial bore intended to allow passage of a screw as well as molded projections and/or recesses which engage in form-locking fashion into shaped recess and/or projections on the supporting plate and/or shoulder piece. Such a transverse rail can have one hump fitted against the end face of a shoulder piece while a screw passed through the hump and through the shoulder piece and into the female threaded bore in the transverse part of the side holder can be attached to the side holder. Such a transverse rail serves to hold further accessory equipment for taking photographs, e.g. flash gun, light meter sensor, etc.

According to a further embodiment of the invention, the hand grip is characterized in that the transverse rail has holes, preferably screwthreaded holes, which serve to accommodate attachment of a flash shoe.

According to a further embodiment of the invention, the hand grip has at least one spacer with a through-bore preferably having a female screwthread and having at the end molded projections and/or recesses which engage in form-locking fashion into shaped recesses and/or projections on the transverse rail and/or on the supporting plate. By means of this spacer, farther-reaching adaptation of the hand grip to the shape of the camera and to the need to be able to use the hand grip to hold further accessory equipment for photography becomes possible.

In the case of the hand grip according to the invention, all individual parts such as side holder, supporting plate, shoulder piece, spacer, transverse rail, can be optionally interchanged and/or connected to one another. Thus, the hand grip acquires a variable form which makes it possible to dispose the grip on the camera body in any of the three positions explained at the outset in order to cope with the circumstances involved in attaching the hand grip to the camera body of different cameras and at the same time mount accessory equipment on the hand grip in cases where such accessory equipment must for photographic purposes be in a definite location in relation to the lens of the camera, such as a flash gun or a photo sensor which controls the light radiated from the flash gun.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
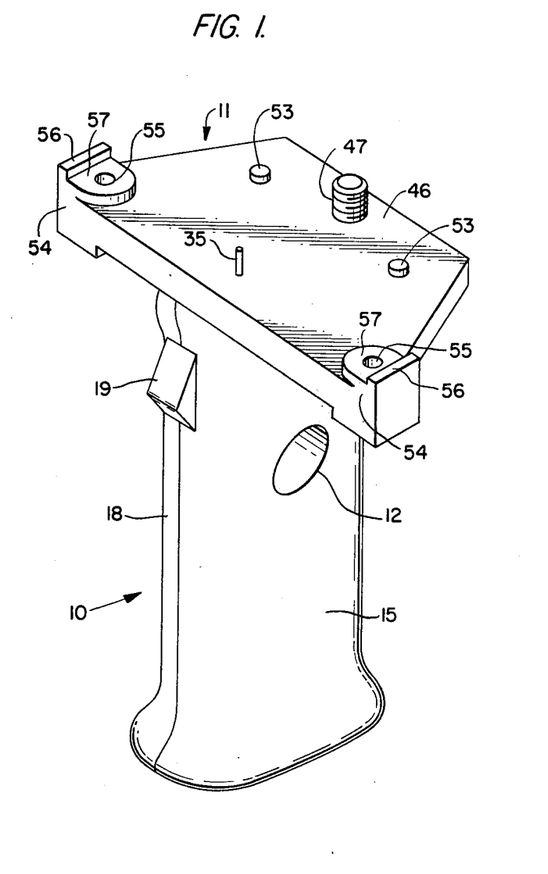
FIG. 1 is a perspective view of a camera hand grip obliquely from above and from the front.
Figure 2:
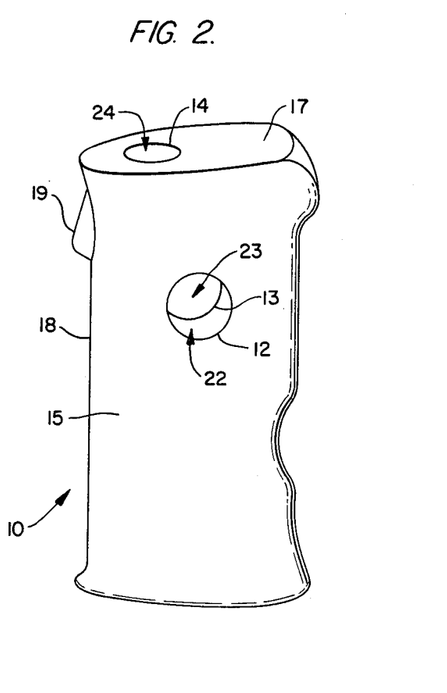
FIG. 2 is a side elevational view of a grip of the camera hand grip in FIG. 1.
Figure 4:
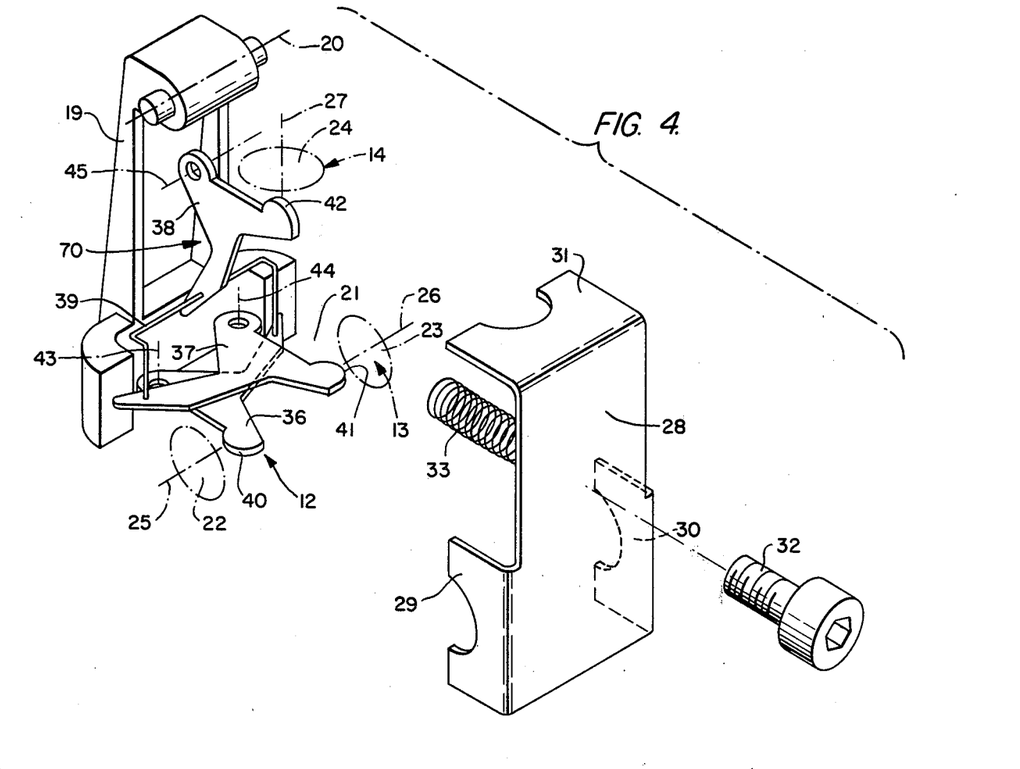
FIG. 4 shows in an enlarged exploded view details of the interior of the grip shown in FIG. 2.
Figure 5:
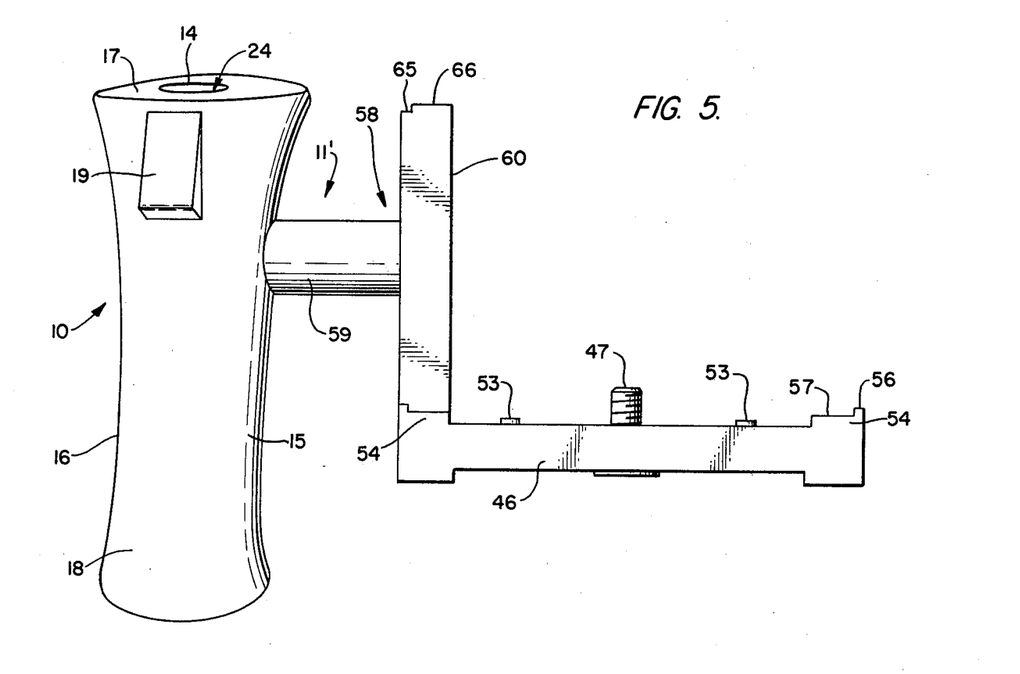
FIG. 5 is a front view of a camera hand grip according to a second embodiment of the invention.
Figures 6, 7:
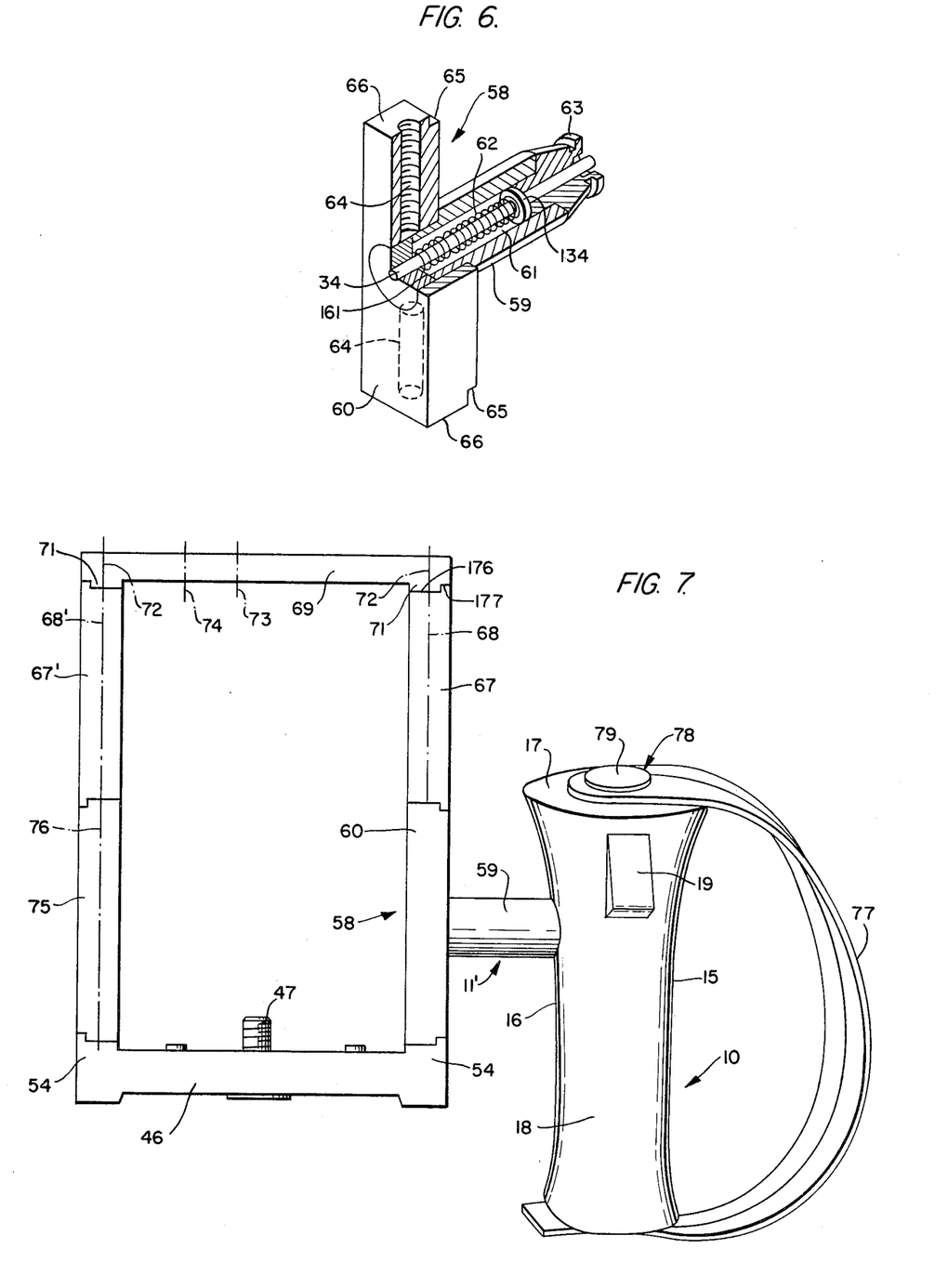
FIG. 6 is a perspective view of a side holder of the camera hand grip of FIG. 5 with a lengthwise cross-section through the middle part.
FIG. 7 shows a front view of a camera hand grip according to a third embodiment of the invention.

The embodiments of a camera hand grip as shown in FIGS. 1, 5 and 7 all have the same grip 10 shown separately in FIG. 2 and a differently constructed connecting member which can be fixed to the camera body of a camera and which connects the camera body to the grip 10 and vice versa. These connecting members 11, 11' and 11" are each separably connected to the grip 10. To this end, the grip 10 has altogether three fixing housings 12, 13 and 14 into which any of the connecting members can optionally be inserted and secured. Two of the fixing housings 12 and 13 are disposed directly opposite each other and are accessible from the lateral faces 15, 16 of the grip 10, while the third fixing housing 14 is accessible from the upper end face 17 of the grip 10. On the front face 18 of the grip 10 which, when the hand grip is mounted on the camera, is always directed towards the object to be photographed, a release button is disposed close to the upper end face 17. The release button which is constructed as a rocker button 19 is held so that it can pivot about an axis 20 in the grip 10 (FIGS. 4 and 8) and it protrudes beyond the front face 18 of the grip 10.

Figure 8:
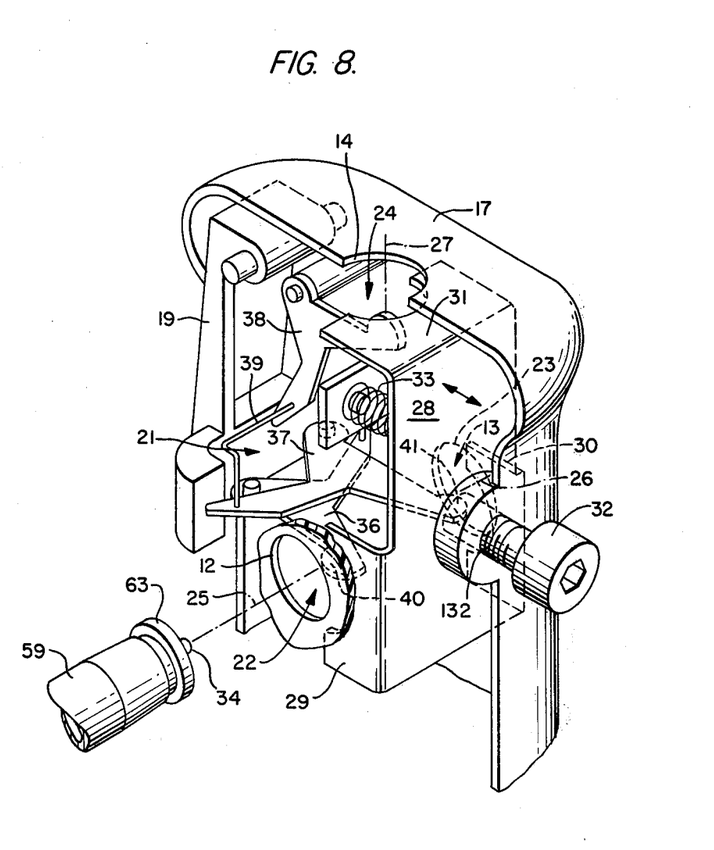
FIG. 8 shows a fragmentary perspective view, partly in cross-section, of the camera hand grip with the internal parts of FIG. 4 associated therewith.

As shown in FIGS. 4 and 8, the fixing housings 12, 13 and 14 have a common central cavity 21 and in each case, terminating in the cavity, a bore or hole 22, 23 and 24 for insertion of the connecting members. As shown, the bore axes 25, 26 and 27 constitute the axes of the fixing housings 12, 13, 14. In FIG. 4, the cavity 21 is indicated diagrammatically by the bores 22, 23 and 24 which are shown therein in dash-dotted lines. For securement of the connecting member 11 or 11', there is in the grip 10, and in fact in its cavity 21, a locking member 28, which in its locked position has lugs 29, 30 and 31 which extend into the fixing housings 12, 13 and 14. The lugs are constructed so that they engage behind an edge disposed on the connecting member 11 and which will be described in greater detail hereinafter. In the locking position, the lugs 29, 30 and 31 of the locking member 28 become pushed immediately behind the mouth of the bores 22, 23 and 24 respectively in the cavity 21, and bear on the one hand on the rim of the connecting member and on the other hand on the face of that wall of the grip 10 which surrounds the cavity 21. Thus, withdrawal of one of the connecting members 11 and 11' from one of the fixing housings 12, 13 or 14 is reliably prevented. In order to actuate the locking member 28 to its locking position, a setscrew 32 is provided which is screwed into a screwthreaded bore 132 in the grip 10, axially displacing the locking member 28 in the direction of the bore axes 25, 26, and 27. To return the locking member 28 from the locking position when the setscrew 32 is loosened, a restoring spring 33 is provided. This is preferably constructed as a coil spring which is biased at one end against the locking member 28 and at the other end against a wall in the grip 10 which defines the cavity 21.

A push rod is held in axially displaceable position in the connecting member for transmitting the pivoting movement of the release button 19 to a shutter release or release contact as conventionally located on a camera body, not shown here. When the release button 19 is not actuated, the push rod remains at the camera end in direct contact with the release or release contact but without mechanically displacing the latter. Located in the grip 10 and in fact in the cavity 21 thereof, there is a lever transmission structure 70 which converts the pivoting movement of the release button 19 into an axial displacement of the push rod. In the case of the connecting member 11 being constructed in accordance with FIGS. 1 and 3, the push rod is designated 35 (FIG. 3), while in the case of the embodiments of FIGS. 5 to 7, which use the connecting member 11', the push rod is designated 34 (FIG. 6). The lever transmission structure 70, shown on an enlarged scale in FIG. 4, is in engagement with the release button 19 and protrudes in part into the fixing housings 12, 13 and 14, whereby in these fixing housings, a portion enters into operative engagement with the push rod 34 or 35 of whichever connecting member is inserted into one or more of the fixing housings. For this purpose, three two-armed levers 36, 37, 38 are pivotally mounted in the grip 10 and in the cavity 21 thereof. The levers 36 to 38 each have one arm bearing on the release button 19, with initial tension provided by the curved spring 39. The other arm of each of the respective levers 36 to 38 projects into one of the fixing housings 12 to 14 in such a way that, in each case, its free end 40, 41 or 42 lies more or less on one of the bore axes 25, 26, or 27. Therefore, the lever pivoting axes 43, 44, 45 are aligned transversely of the axes of the fixing housings associated with them. For example, the lever pivoting axis 43 of the lever 36 lies at a right angle to the bore axis 25; the lever pivoting axis 44 of the lever 37 is at a right angle to the bore axis 26; and the lever pivoting axis 45 of the lever 38 is at a right angle to the bore axis 27. When the release button 19 is actuated, the levers 36, 37 are pivoted about their respective axis, and their respective free ends 40, 41 and 42 move in a substantially axial direction through a small path on the bore axes 25, 26 and 27, this small distance being sufficient to produce an axial displacement of the push rod 34 or 35 which is aligned with one of the bore axes 25, 26 or 27 after insertion of a connecting member in the grip 10. The push rod 34 or 35 then actuating in turn the release or release contact at the camera end.

Figure 3:
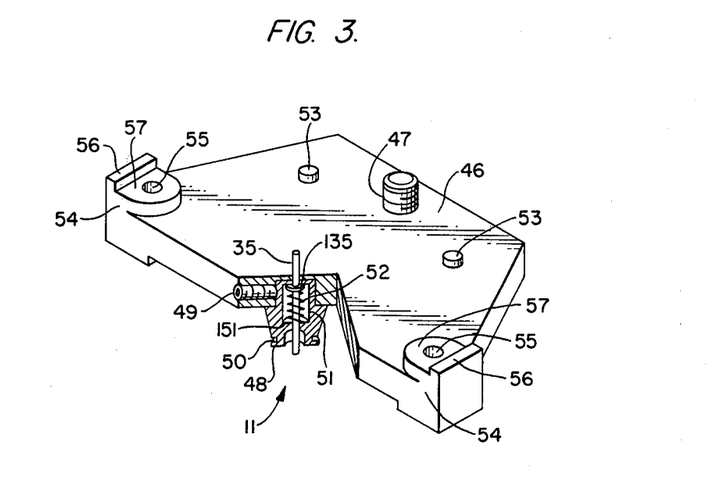
FIG. 3 is a perspective view of a supporting plate of the camera hand grip in FIG. 1, viewed obliquely from above.

In the case of the camera hand grip according to the preferred embodiment of FIG. 1, the connecting member 11 is constructed as a supporting plate 46 which has for association with a tripod screwthread in the camera body a tripod screw 47, and a transversely projecting bolt 48 (FIG. 3). The bolt 48 which is shown in cross-section in FIG. 3, projects downwardly from the supporting plate and is separably held by a screw 49 in a blind bore in the supporting plate 46. The bolt 48 tapers towards the free end in conical fashion and has an annular flange 50 which constitutes for the connecting member 11 an edge behind which it is possible to grip. Thus, the lug 31 of the locking member 28 is able to grip behind this annular flange 50. The bolt 48 has an axial through-bore 51 which is preferably constructed as a stepped bore in which the push rod 35 is displaceably held. The push rod 35 protrudes at the top of the supporting plate 46. The push rod 35 is secured against falling out of the axial through-bore by a coil spring 52 braced at one end on a shoulder 151 on the stepped bore 51 and at the other end on an annular flange 135 provided on the push rod 35.

The bolt 48 can be inserted into the fixing housing 14 on the upper end face 17 of the grip 10, with the lug 31 on the locking member 28 engaging behind the annular flange 50 when the locking member 28 is in its locked position. Thus, the supporting plate 46 is held on the grip 10, and at the same time the push rod 35 bears on the free end 42 of the lever 38 of the lever transmission structure 70. Thus prepared, the hand grip is applied with the supporting plate 46 to the bottom of the camera body, the tripod screw 47 which is held in the supporting plate 46 being screwed into the tripod nut normally provided in the bottom of the camera body. So that the supporting plate 46 cannot twist on the camera body, there are provided on the upper side of the supporting plate 46 two studs or nipples 53 which can engage into corresponding depressions in the camera body. Upon attachment of the supporting plate 46 to the bottom of the camera body, the push rod 35 simultaneously engages a recess provided in the camera body and enters into touching contact with the camera shutter release contact.

If, now, the release 19 is depressed, all the levers 36, 37 and 38 of the lever transmission structure 70 pivot in the previously described manner. Since only the upper fixing housing 14 has presently a connecting member 11 in the form bolt 48 and supporting plate 46, the movement of the levers 36 and 37 of course have no effect. However, the lever 38 does function and displaces the push rod 35 by an amount which is sufficient to close the release contact in the camera. When the release button 19 is released again, the levers 36, 37 and 38 all pivot under the action of the spring 39 back into their starting positions as shown in FIG. 4. The push rod 35 is returnd to its basic position by the coil spring 52.

The supporting plate 46 also has two laterally disposed humps 54 projecting transversely from its surface and which are each provided with an axial through-bore 55. On their end faces, the humps have molded projections 56 and molded depressions 57. The object and purpose of these humps 54 will be explained in greater detail hereinafter.

In the case of the two embodiments of camera hand grips shown in FIGS. 5 and 7, the connecting member is constructed with a substantially T-shaped side holder 58, such as is indicated as a component in FIG. 6. The side holder 58 has a substantially cylindrical middle part 59 and a transverse part 60. The middle part 59 has an axial through-bore 61 which is likewise preferably constructed as a stepped bore. The push rod 34 is mounted in this through-bore 61 and is secured against falling out by a cylindrical coil spring 62 which engages around the push rod and which engages at one end with a shoulder 161 in the stepped bore 61 and at the other end with an annular flange 134 on the push rod 34. The free end of the middle part 59 tapers conically and has an annular flange 63 which functions with the connecting member as a rim behind which it is possible to engage. Thus, the lug 29, or the lug 30, of the locking member 38 can engage behind this annular flange, according to whether the side holder 58 projects from the left-hand side 15 (FIG. 5) or the right-hand side 16 (FIG. 7) of the grip 10. The side holder 58 is attached to grip 10 by the conically tapering end of the middle part 59 being pushed into one of the lateral fixing housings 12 or 13, after which it is locked by means of the locking member 28, by the screwing-in of the setscrew 32. The push rod 34 is thereby flush with either the bore axis 25, or the bore axis 26, of the fixing housing 12 or 13, and bears on the free end 40 or 41 of the lever 36 or 37.

The transverse part 60 of the side holder 58 has two threaded bores 64 with an axially orientated bore axis, each of the bores opening at one of the two end faces of the transverse part. It is possible to screw into these threaded bores 64 screws which serve to attach the supporting plate 46 to the side holder 58 as in FIG. 5. Provided on the two end faces of the transverse part are identical shaped recesses 65 and shaped projections 66. The shaped projections 66 are complementary to the shaped recesses 57 and the shaped recesses 65 are complementary to the shaped projections 56 on the humps 54 on the supporting plate 46, so that when the end face of the transverse part 60 is applied to a hump 54, they inter-engage in form-locking fashion. If, now, a screw is passed through the axial bore 55 in the hump 54 and is screwed into the threaded bore 64 in the transverse part 60, then a camera hand grip is created such as is illustrated in FIG. 5. The bolt 48 (FIG. 3) has been in this case unscrewed from the supporting plate 46. The camera hand grip can now be attached by the supporting plate 46 against the bottom of the camera body where it can be secured by means of the tripod screw 47. In this case, the push rod 34 which is held in the middle part 59 of the side holder 58 has its camera end directly in front of a manual release located at the side of the camera body. If, now, the release button is actuated, then in the case of the hand grip according to FIG. 5, also the lever 36 of the lever transmission structure 70 will be pivoted. Since the push rod 34 bears directly on the free end 40 of the lever 36, this latter is displaced and in turn actuates the release in the camera body.

In the case of the embodiment of the camera hand grip according to FIG. 7, the side holder 58 can again be seen, but this time it is fitted on the right-hand side 16 of the grip 10, into the fixing housing 13 provided therein. This alternative form of hand grip is intended for left-handed people and for a camera with an indirect vision ground glass viewfinder. Here, too, the side holder 58 is connected to the supporting plate 46 via its transverse part 60. However, in contrast to FIG. 5, in this case the other hump 54 of plate 46 is applied to the lower end face of the transverse part 60 and secured by a screw. In addition, in this embodiment, fitted onto the upper end face of the transverse part 60 by its own end face is a shoulder member 67 which serves as an extension of the transverse part 60. This shoulder member has an elongated bore 68 which is indicated by the dash-dotted line in FIG. 7. The end faces of the shoulder member 67 are likewise provided with shaped recesses and shaped projections one pair of which engage in form-locking manner with the shaped projection 66 and shaped recess 65 on the upper end face of the transverse part 60. It is possible to pass through the longitudinal bore 68 a screw which can then be screwed into the threaded bore 64 in the transverse part 60. The hand grip according to the embodiment of FIG. 7 further has a transverse rail 69 with two humps 71 projecting transversely, one at each end. These humps are identical to the humps 54 on the supporting plate 46. They likewise have a central through-bore 72 and have on their free faces shaped recesses 177 and shaped projections 176 which are identical to the shaped recesses 57 and shaped projections 56 on the humps 54 of plate 46 and/or the recesses 65 and projections 66 on the transverse part 60 of the side holder 58, and are so located that they engage in form-locking fashion into the shaped recesses and shaped projections on the end face of the shoulder member 67, when the hump 71 is fitted thereon. The transverse rail 69 and the shoulder member 67 are held on the side holder 58 by a screw which is passed through the bore 72 in the hump 71, the transverse rail 69 and through the longitudinal bore 68 in the shoulder member 67, and which is screwed into the threaded bore 64 in the transverse part 60 of the side holder 58. The transverse rail 69 also has housing apertures 73 and 74 which are indicated through their central axes as depicted in FIG. 7. These apertures 73 and 74 serve for attachment of a flash shoe on the transverse rail 69 so that it functions as a structure for holding a flash gun. However, it is also possible for other accessory equipment required for photographic purposes, preferably such equipment as must be in a definite spatial relationship to the camera lens, to be mounted on the transverse rail 69.

A further possible arrangement of the hand grip in FIG. 7 is provided by a spacer 75 having an axial through-bore with an internal screwthread. This threaded bore 76 is identified in FIG. 7 by its central axis. The two end faces of the spacer 75 are in turn provided with identical shaped recesses and shaped projections like those already described. Then the spacer 75 has one end face applied against a hump 54 on the supporting plate 46, and is secured to the supporting plate 46 by a screw which is passed through the bore 55 in the hump 54 and screwed into the threaded bore 76. On the other end face of the spacer 75 there is applied a further shoulder member 67' which is identical to the shoulder member 67. The second hump 71 on the transverse rail 69 rests on the end face of the second shoulder member 67'. By means of a screw which is passed through the bore 72 in the hump 71, through the longitudinal bore 68' in the shoulder member 67' and which is screwed into the threaded bore 76, the transverse rail 69, the shoulder member 67' and the spacer 75 are rigidly connected to one another.

As can be seen from FIG. 7, the transverse part 60 of the side holder 58, the supporting plate 46, the spacer 75, the second shoulder member 67', the transverse rail 69 and the shoulder member 67 now form a rigid frame which surrounds the camera body. The camera is connected again to the supporting plate 46 via the tripod screw 47. Thus, the push rod 34 guided in the side part 58 is directly on the camera release which is provided on the left of the camera body, and the camera release is therefore actuated by the push rod when the release button 19 on the grip 10 is operated.

The fixing housing 14 which terminates at the upper end face 17 of the grip 10 serves in the case of the hand grip shown in FIG. 7 for attachment of a hand loop 77 to the grip 10. For this purpose, a stud 78 which has a free conically tapering end with flange like that of the conical end of the bolt 48, is provided which is inserted into the fixing housing 14 and held by the lug 31. The stud 78 carries a large diameter pressure applying disc 79 which is passed through a slot in the hand loop 77. The pressure applying disc 79, when the stud 78 is locked, holds the hand loop against the end face 17 of the grip 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:

1. A camera hand grip for separable connection to a camera, with a grip having a lateral fixing housing and with a connecting member between the grip and the camera body, which is separably connected to the grip via the fixing housing and which can be locked on the camera body, wherein the grip has a further lateral fixing housing disposed opposite the first fixing housing and an additional fixing housing accessible from the upper end face of the grip for receiving the connecting member, a release button being disposed on the grip, an axially displaceable push rod in the connecting member which transmits the movement of the release button to a shutter release of the camera body, a transmission structure provided in the grip for meshing with the release button, said transmission structure having an end protruding into each fixing housing so that each respective end can enter into operative engagement with the push rod of the connecting member regardless of which one of the three fixing housings are being used.

2. A hand grip according to claim 1, wherein there is a locking member located in the grip which has lugs which project into the respective fixing housings and which are constructed when in a locking position to engage behind a rim located on said connecting member.

3. A hand grip according to claim 2, wherein the locking member is engaged by a set screw for moving it into the locked position, and a restoring spring which moves it away from the locked position.

4. A hand grip according to claim 1, wherein the transmission structure includes three individual pivotally mounted two-armed levers, each of which has one arm, pretensioned, bearing on the release button which is pivotally held in the grip while the free end of the other arm of each lever lies in each case in an axis of a fixing housing.

5. A hand grip according to claim 4, wherein the lever pivoting axes are oriented transversely of the axes of the fixing housings associated with each of the individual levers.

6. A hand grip according to claim 1, wherein the fixing housings have a common central cavity and in each case, discharging into the cavity, a bore for insertion of the connecting member, the bore axes constituting the axes of the fixing housings, and furthermore wherein said transmission structure and a locking member are disposed in the cavity.

7. A hand grip according to claim 6, wherein the connecting member is constructed as a substantially T-shaped side holder with a cylindrical middle part, and said middle part accommodating a push rod, an axial through-bore in line with the axis of at least one fixing housing in the grip, the bore being a stepped bore, said middle part having a conically tapering free end carrying an annular flange which constitutes a rim behind which it is possible to engage, and further a transverse part which serves to fix the side holder on the camera body having terminating end faces with threaded bores with an axial bore axis into which it is possible to screw screws which serve for attachment to the camera.

8. A hand grip according to claim 7, wherein the end faces of the transverse part are provided with shaped recesses and shaped projections.

9. A hand grip according to claim 1, wherein the connecting member is constructed as a supporting plate carrying a tripod screw for association with a tripod thread in the camera body and a transversely projecting bolt which tapers conically towards the free end, said bolt having a stepped axial through-bore, which is in line with the axis of the fixing housing in the end face of the grip and which accommodates said push rod, and the bolt having at its free end an annular flange forming a rim behind which it is possible to engage.

10. A detachable hand grip for a camera compising: a grip having a lateral fixing housing; a connecting member provided for use between the grip and the camera body which is separably connected to the grip via the fixing housing and which can be locked on the camera body; said grip further having a second lateral fixing housing disposed opposite the first fixing housing; an additional fixing housing opening from the upper end face of the grip for receiving the connecting member; said grip further being provided with a release button, said connecting member being provided with an axially displaceable push rod for transmitting the movement of said release button to release means associated with the camera, said grip further having a transmission means so that the grip can be affixed to the camera from three sides and in each case the camera release means can be operated from said release button and for meshing with the release button which has an end protruding into each one of said three fixing housings so that said end can enter into operative engagement with the push rod of the connecting member no matter which one of the three fixing housings has said connecting member connected therewith.

11. A hand grip according to claim 10, wherein there is further provided in the grip a locking member which has lugs for association with the respective fixing housings and which are arranged so when in a locking position at least one of them engages a flange provided on said connecting member.

12. A hand grip according to claim 11, wherein the locking member is actuated by adjustable means for moving it into the locked position, and restoring means is also provided for moving it away from the locked position.

13. A hand grip according to claim 10, wherein the transmission means includes three individual pivotally mounted two-armed levers, each of which has one arm, pretensioned, bearing on the release button which is pivotally held in the grip while the free end of the other arm of each lever lies in each case in an axis of a fixing housing.

14. A hand grip according to claim 13, wherein the lever pivoting axes are orientated transversely of the axes of the fixing housings associated with each of the individual levers.

15. A hand grip according to claim 10, wherein the three fixing housings provided in said grip have a common central cavity and in each case, discharging into the cavity, a bore for insertion of the connecting member, the bore axes constituting the axes of the fixing housings, and furthermore wherein said transmission means and a locking member are disposed in the cavity.

16. A hand grip according to claim 15, wherein the connecting member is constructed as a substantially T-shaped side holder with a cylindrical middle part, and said middle part accommodating a push rod, an axial through-bore in line with the axis of at least one fixing housing in the grip, the bore being a stepped bore and said middle part having a conically tapering free end carrying an annular flange which constitutes a rim behind which it is possible to engage, and said T-shaped side holder further having a transverse part which serves to fix the side holder on the camera body which has, terminating at the end faces, threaded bores with an axial bore axis into which it is possible to screw screws which serve for attachment to the camera.

17. A hand grip according to claim 16, wherein the end faces of the transverse part are provided with shaped recesses and shaped projections.

18. A hand grip according to claim 10, wherein the connecting member is constructed as a supporting plate carrying a tripod screw for association with a tripod thread in the camera body and a transversely projecting bolt which tapers conically towards the free end, said bolt having an axial through-bore which is in line with the axis of the fixing housing in the end face of the grip and which accommodates said push rod, and the bolt having at its free end an annular flange forming a rim behind which it is possible to engage.

* * * * *